United States Patent
Nair et al.

(10) Patent No.: US 10,132,031 B1
(45) Date of Patent: *Nov. 20, 2018

(54) FOAMED, OPACIFYING ELEMENTS WITH THERMALLY TRANSFERRED IMAGES

(71) Applicant: Eastman Kodak Company, Rochester, NY (US)

(72) Inventors: Mridula Nair, Penfield, NY (US); Diane Marie Herrick, Rochester, NY (US)

(73) Assignee: EASTMAN KODAK COMPANY, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/590,313

(22) Filed: May 9, 2017

(51) Int. Cl.
| | |
|---|---|
| *C08J 9/236* | (2006.01) |
| *D06N 3/00* | (2006.01) |
| *B41M 5/00* | (2006.01) |
| *C09D 11/02* | (2014.01) |
| *C09K 21/06* | (2006.01) |
| *B41M 5/40* | (2006.01) |
| *C09D 5/32* | (2006.01) |
| *G02B 5/00* | (2006.01) |
| *C09D 7/40* | (2018.01) |

(52) U.S. Cl.
CPC ........... *D06N 3/0043* (2013.01); *B41M 5/007* (2013.01); *B41M 5/0052* (2013.01); *B41M 5/0064* (2013.01); *B41M 5/40* (2013.01); *C08J 9/236* (2013.01); *C09D 5/32* (2013.01); *C09D 7/40* (2018.01); *C09D 11/02* (2013.01); *C09K 21/06* (2013.01); *D06N 3/0065* (2013.01); *G02B 5/003* (2013.01); *D06N 2209/0823* (2013.01); *D06N 2209/0853* (2013.01)

(58) Field of Classification Search
CPC .. B41M 5/0052; B41M 5/0064; B41M 5/007; B41M 5/40; C08J 9/236; C09D 5/32; C09D 7/40; C09D 11/02; C09K 21/06; D06N 3/0043; D06N 3/0065; D06N 2209/0823; D06N 2209/0853; G02B 5/003

See application file for complete search history.

(56) References Cited

U.S. PATENT DOCUMENTS

| | | |
|---|---|---|
| 3,363,557 A | 1/1968 | Blake |
| 3,607,341 A | 9/1971 | Goins et al. |
| 3,713,868 A | 1/1973 | Gordon et al. |
| 3,952,131 A | 4/1976 | Sideman |
| 4,097,230 A | 6/1978 | Sandhu |
| 4,117,699 A | 10/1978 | Renaut |
| 4,139,343 A | 2/1979 | Steiner |
| 4,439,473 A | 3/1984 | Lippman |
| 4,457,980 A | 7/1984 | Daniels et al. |
| 4,576,610 A | 3/1986 | Donenfeld |
| 4,677,016 A | 6/1987 | Ferziger et al. |
| 5,576,054 A | 11/1996 | Brown |
| 5,668,081 A | 9/1997 | Simpson et al. |
| 5,741,482 A | 4/1998 | Leaderman et al. |
| 6,036,808 A | 3/2000 | Shaw-Klein et al. |
| 7,153,626 B2 | 12/2006 | Foster et al. |
| 7,572,846 B2 | 8/2009 | Engelbrecht et al. |
| 8,252,414 B2 | 8/2012 | Putnam et al. |
| 8,329,783 B2 | 12/2012 | Nair et al. |
| 8,435,340 B2 | 5/2013 | Wheeler et al. |
| 8,628,185 B1 | 1/2014 | Hale et al. |
| 9,315,682 B2 | 4/2016 | Delys et al. |
| 9,334,381 B2 | 5/2016 | Nair |
| 9,469,738 B1 | 10/2016 | Nair et al. |
| 2002/0122949 A1 | 9/2002 | Richards |
| 2012/0097194 A1* | 4/2012 | McDaniel ............. A01N 63/02 134/26 |
| 2012/0273122 A1 | 11/2012 | Majumdar et al. |
| 2015/0093512 A1 | 4/2015 | Brunner et al. |
| 2015/0234098 A1 | 8/2015 | Lofftus et al. |
| 2016/0354804 A1 | 12/2016 | Brick et al. |

FOREIGN PATENT DOCUMENTS

| | | |
|---|---|---|
| EP | 1 380 616 A1 | 1/2004 |
| WO | WO84/04489 | * 11/1984 |

OTHER PUBLICATIONS

Johnny Shell, "Digital Textile Inkjet Printing: Current State of Technology," SGIA Journal, Winter 2017, pp. 5-8.

* cited by examiner

*Primary Examiner* — John M Cooney
(74) *Attorney, Agent, or Firm* — J. Lanny Tucker

(57) ABSTRACT

A foamed, opacifying element has a thermal colorant image on either an opposing external surface and an internal surface of a porous substrate. The internal surface has a dry foamed composition disposed thereon as a dry opacifying layer that comprises: (a) 0.1-40 weight % of porous particles; (b) at least 10 weight % of an at least partially cured binder material; (c) at least 0.2 weight % of one or more additives comprising a surfactant; (d) less than 5 weight % of water; and (e) at least 0.002 weight % of an opacifying colorant different from all of the one or more (c) additives, which opacifying colorant absorbs predetermined electromagnetic radiation. The thermal colorant image is derived from thermal colorant transfer of sublimable colorants from a thermal donor element.

20 Claims, No Drawings

FOAMED, OPACIFYING ELEMENTS WITH THERMALLY TRANSFERRED IMAGES

RELATED APPLICATIONS

U.S. Ser. No. 15/590,342, (filed on May 9, 2017, by Herrick and Nair);

U.S. Ser. No. 14/181,766 (filed Feb. 17, 2014 by Lofftus, Nair, and Brick), now published as U.S. Patent Application Publication 2015/0234098;

U.S. Ser. No. 15/144,893 (filed May 3, 2016 by Brick, Nair, and McHugh) that is a continuation-in-part of commonly assigned U.S. Ser. No. 14/730,280, filed Jun. 4, 2015 by Brick, Nair, Lindner, and Pyszczek, now abandoned.

U.S. Ser. No. 15/144,875 (filed May 3, 2016 by Nair, Brick, and Pyszczek), recently allowed, that is a continuation-in-part of commonly assigned U.S. Ser. No. 14/730,269, filed Jun. 4, 2015 by Brick, Nair, Lindner, and Pyszczek, now abandoned;

U.S. Ser. No. 15/144,911 (filed May 3, 2016 by Brick, Nair, Lindner, and Bessey) that is also a continuation-in-part of commonly assigned U.S. Ser. No. 14/730,280, filed Jun. 4, 2015 by Brick, Nair, Lindner, and Pyszczek, now abandoned;

U.S. Ser. No. 15/239,915 (filed Aug. 18, 2016 by Nair, Brick, and Pyszczek);

U.S. Ser. No. 15/239,978 (filed Aug. 18, 2016 by Nair, Brick, and Sedita); and

U.S. Ser. No. 15/239,938 (filed Aug. 18, 2016 by Nair, Brick, and Bessey);

the disclosures of all of which applications are incorporated herein by reference.

FIELD OF THE INVENTION

This invention relates to foamed, opacifying elements that can be used as light-blocking (blackout) articles, which foamed, opacifying elements also have colorant images provided by thermal transfer processes. The foamed, opacifying elements have a dry opacifying layer derived from foamable aqueous compositions that include unique porous particles in a mixture with other essential components so that composition foaming, application to a porous substrate, drying, and densifying can be readily accomplished.

BACKGROUND OF THE INVENTION

Draperies are primarily designed for style and appearance, and are generally made from fabrics of various colors which are printed or in some other way carry a design or image. Digital printing is replacing traditional methods in the textile industry. The main drivers are the cost-efficiency, ability to personalize prints and flexibility. Traditional screen-printing is being replaced by digital textile printing solutions like thermal transfer or sublimation printing for shorter production runs and personalized prints that require multiple colors and detailed images. Thermal transfer or heat transfer printing is a method to impart a desired color or color pattern or image to a synthetic fabric such as polyester, nylon and acrylic. Thermal transfer printing uses thermally responsive inks containing sublimable colorants that under the influence of heat sublime or vaporize onto the surface of the fabric, penetrate the fibers and be entrained therein or attach to the textile fiber. Heat transfer printing processes and materials are quite old and described in numerous publications, for example, U.S. Pat. No. 3,363,557 (Blake), U.S. Pat. No. 3,952,131 (Sideman), U.S. Pat. No. 4,139,343 (Steiner), U.S. Pat. No. 6,036,808 (Shaw-Klein et al.), U.S. Pat. No. 8,628,185 (Hale et al.), U.S. Pat. No. 9,315,682 (Delys et al.), U.S. Pat. No. 4,117,699 (Renaut), U.S. Pat. No. 4,097,230 (Sandhu), U.S. Pat. No. 4,576,610 (Donenfeld), U.S. Pat. No. 5,668,081 (Simpson et al.), and U.S. Pat. No. 7,153,626 (Foster et al.).

In accordance with such imaging technology, a color pattern (discontinuous or image) to be imparted to a fabric substrate such as a woven, unwoven, or knitted material, is preprinted on a substrate (usually paper or a sheet of non-textile material) referred to as the transfer sheet or transfer donor element, as a print or image with an ink that contains the sublimable colorant. The inks used for preparing the printed pattern contain colorants that are selected to sublime at a temperature that does not compromise the integrity of the fabric or textile substrate. The inks can be applied to an inert, transfer donor support, conventionally paper, by any number of printing processes known in the art, including gravure, flexography, flat screen, rotary screen, electrophotography, and ink jet printing. The preprinted transfer donor element and the fabric to be printed are brought into contact under controlled conditions of time, temperature and pressure such that the colorant of the image is sublimed and transferred from the transfer donor element to the fabric substrate that must be of such a nature that it will receive and retain the transferred inks, to provide a permanent print or image thereon. Since the colorant becomes part of the structure of the material, the images on the fabric are vivid, resistant to fading or deteriorating after multiple washings and show good crock resistance. In addition, the fabric substrate must be resilient to the heat and pressure required for image transfer from volatilization or sublimation of the respective inks that are condensed on and are absorbed by at least the outer surface layers of the individual fibers of the fabric substrate. This effect can readily be obtained on many fabrics made from synthetic fibers, especially polyester fibers and polyester blends with natural fibers.

For example, U.S. Pat. No. 4,139,343 (noted above) discloses transfer sheets for heat transfer printing polyester textiles in yellow hues, inks that are useful in making such transfer sheets, an improved process for heat transfer printing polyester textiles and the printed or dyed fabrics thereby produced.

The art has recognized the difficulty of transferring images to fabrics made from either naturally-occurring or synthetic fibers, particularly fabrics comprising cotton, as described for example in U.S. Pat. No. 4,576,610 (noted above), in which a sublimable composition is formulated with a polyester bonding resin in which the polymer has a substantial amount of free carboxyl groups to markedly improve the depth, evenness and fastness of colors imparted by sublimation dye techniques to cotton and other naturally-occurring fibrous materials.

Draperies made from fabrics and printed as described above to create a desired visual effect are generally ineffective for preventing a substantial quantity of light penetration into a room from outside sources resulting in a corresponding undesirable level of illumination where light is not needed. To completely block undesired light, draperies generally consist of two separate elements: a decorative or printed face fabric, and a separate black out material (or liner) attached to the decorative face fabric by sewing or other means. The blackout material or liner is typically turned towards a window or other light source in front of which the decorative face fabric hangs.

"Blackout" or light-blocking materials typically refer to articles that are substantially impermeable to light such as visible or UV radiation. When a blackout material is used to cover a window or other opening through which light can pass, it is designed to completely block out all external light from entering the room through that window or opening.

Blackout materials are desired by hotels and residences to ensure an ideal sleep environment, to protect the interior from ultraviolet light damage, and to provide privacy. Residential use of blackout materials is also desirable for those living in densely populated urban or suburban areas where the amount of light penetration into a window at night may be considerable due to sources such as street lights, light from adjacent buildings, and vehicle headlights. Hospitals may also use such materials to promote privacy and comfort for patients especially where multiple patients share the same areas.

Costs to fabricate light-blocking draperies (lined with a blackout material) are higher, compared to that of single-textile or unlined draperies, due to added expense of creating a blackout liner material and labor for attaching the blackout liner material to the face fabric. In addition, drapery fabricators must keep sufficient inventory of blackout liner material on hand. U.S. Pat. No. 5,741,582 (Leaderman et al.), suggests the possibility of imprinting, dyeing, or decorating a blackout architecture made up of material fabric on both sides of the drapery lining instead of the exposed foam thereby serving as a self-lined drapery fabric.

Blackout materials or liners are multi-layer structures, with a minimum of three separate coated layers. For example, U.S. Pat. No. 4,677,016 (Ferziger et al.) describes a light-blocking article comprising a fabric backed with a first coat of white acrylic foam, followed by a second coat of an acrylic foam having an opaque color, and finally, a third coat of white acrylic foam. U.S. Patent Application Publication 2002/0122949 (Richards), describes a light-blocking article as a laminated structure comprised of two layers of fabric, two layers of foam, and a metalized plastic sheet.

These multi-layer blackout liners are sufficiently impermeable to light but unsuitable for thermal transfer printing. They are prone to substantial off-gassing thereby producing unacceptable levels of noxious fumes at the temperatures required to sublime and transfer sublimable colorants. High temperatures may also cause multi-layer blackout materials to suffer delamination or loss of adhesion between layers. Poor image quality due to incomplete and inconsistent transfer of the sublimable inks from donor elements to multi-layer blackout liners is commonly reported. Such problems can arise with multi-layer blackout liners known in the art even those that comprise polyester or another synthetic fabric including a blend, because of the continuous layer of sandwiched carbon black that can absorb heat and thereby act as a heat sink during the intended sublimation process. These unwanted effects could arise in metallized blackout curtains as well.

Thus, there is a need to provide blackout articles containing suitable colorant images or prints achieved using thermal transfer chemistries and processes that avoid these problems.

SUMMARY OF THE INVENTION

The present invention provides a foamed, opacifying element comprising a thermal colorant image, the foamed, opacifying element further comprising a porous substrate having an opposing external surface and an internal surface, the internal surface having a dry foamed composition disposed thereon as a dry opacifying layer, wherein the dry foamed composition comprises:

(a) at least 0.1 weight % and up to and including 40 weight % of porous particles, each porous particle comprising a continuous polymeric phase and a first set of discrete pores dispersed within the continuous polymeric phase, the porous particles having a mode particle size of at least 2 μm and up to and including 50 μm and a porosity of at least 20 volume % and up to and including 70 volume %, and the continuous polymeric phase having a glass transition temperature greater than 80° C. and comprising a polymer having a viscosity of at least 80 centipoises and up to and including 500 centipoises at a shear rate of 100 sec$^{-1}$ in ethyl acetate at a concentration of 20 weight % at 25° C.;

(b) at least 10 weight % of an at least partially cured binder material;

(c) at least 0.2 weight % of one or more additives comprising a surfactant;

(d) less than 5 weight % of water; and (e) at least 0.002 weight % of an opacifying colorant different from all of the one or more (c) additives, which opacifying colorant absorbs predetermined electromagnetic radiation, all amounts being based on the total weight of the dry foamed composition, wherein the dry opacifying layer has a light blocking value of at least 4 as well as a luminous reflectance that is greater than 40% as measured by the Y tristimulus value, and wherein the thermal colorant image is disposed on the opposing external surface, the dry opacifying layer, or both the opposing external surface and the dry opacifying layer.

The foamed, opacifying elements and methods used to prepare them according to the present invention provide a number of advantages. The present invention overcomes the disadvantages of the articles known in the art by providing stand-alone, self-lined draperies (foamed, opacifying elements) that are impermeable to light and durable enough to withstand the temperatures required for thermal transfer printing operations. The inventive foamed, opacifying element is a stand-alone, self-lined, light-blocking drapery having a porous substrate, a single dry opacifying layer derived from a dry foamed composition disposed on one supporting side (or internal surface) of the porous substrate, and a thermally transferred colorant image disposed on the opposing external surface porous substrate or the dry opacifying layer. In most embodiments, the foamed, opacifying elements consist only of these specific features. Thus, either or both opposing external surface and internal surface (or opposing sides) of the foamed, opacifying element can have an applied decorative pattern or image provided using thermal transfer processes.

The foamed, opacifying element provided according to the present invention avoids the use of a layer of carbon black that can act as a heat sink during thermal colorant transfer processes. In addition, the present invention reduces the effluence of noxious fumes common during known transfer colorant transfer processes.

The foamed, opacifying elements contain very low amounts of opacifying colorants in the dry opacifying compositions that are not damaged by temperatures greater than 100° C. that may be used during the thermal colorant transfer processes or during manufacturing drying operations. The foamed, opacifying elements (or light-blocking articles) such as stand-alone, self-lined blackout draperies exhibit desired opacity, improved flexibility, "hand," and drapeability. Manufacturing operations (methods) can be readily carried out in a continuous manner for example, in a roll-to-roll operation.

It is highly important to understand that the foamed, opacifying elements according to this invention have simpler construction than light-blocking articles described in the prior art. For example, such articles comprise a single dry opacifying layer that is both opacifying and resistant to delamination at high temperature and pressure. The present invention avoids thick and multi-layer constructions while providing the noted advantages with very little opacifying colorant (for example, up to and including 1 weight % of total solids). Because the opacifying colorant can be contained within the porous particles and there is so little of the opacifying colorant used, the foamed, opacifying element remains light-colored and when it is damaged or punctured, the escape of opacifying colorant and its effect on other materials are minimized. Additionally, the low levels of opacifying colorant enables more efficient thermal colorant transfer.

In some embodiments, the foamed, opacifying elements prepared according to the present invention comprise a single dry opacifying layer that also has any or all antimicrobial, opacifying, and flame retardant properties as well as the required light-blocking properties.

DETAILED DESCRIPTION OF THE INVENTION

The following discussion is directed to various embodiments of the present invention and while some embodiments can be desirable for specific uses, the disclosed embodiments should not be interpreted or otherwise considered to limit the scope of the present invention, as claimed below. In addition, one skilled in the art will understand that the following disclosure has broader application than is explicitly described and the discussion of any embodiment.

Definitions

As used herein to define various components of the foamed aqueous composition, foamable aqueous composition, dry foamed composition, thermal colorant transfer compositions, or materials used to prepare the porous particles, unless otherwise indicated, the singular forms "a," "an," and "the" are intended to include one or more of the components (that is, including plurality referents).

Each term that is not explicitly defined in the present application is to be understood to have a meaning that is commonly accepted by those skilled in the art. If the construction of a term would render it meaningless or essentially meaningless in its context, the term definition should be taken from a standard dictionary.

The use of numerical values in the various ranges specified herein, unless otherwise expressly indicated otherwise, are considered as approximations as though the minimum and maximum values within the stated ranges were both preceded by the word "about." In this manner, slight variations above and below the stated ranges can be used to achieve substantially the same results as the values within the ranges. In addition, the disclosure of these ranges is intended as a continuous range including every value between the minimum and maximum values.

Unless otherwise indicated, the terms "foamed, opacifying element," "light-blocking element," "light-blocking article," and "light-blocking drapery" are intended to refer to the same material.

Unless otherwise indicated, the term "opposing external surface" refers to a planar surface of a porous substrate (defined below) that typically does not have a dry opacifying layer disposed thereon. Such opposing external surface can be the surface of the foamed, opacifying element that typically faces a viewer.

Unless otherwise indicated, the term "internal surface" refers to a planar surface of a porous substrate (defined below) on which a dry opacifying layer is disposed for blocking impinging light from various sources such as sunlight, street light, and any source of external light that is to be blocked from exiting the foamed, opacifying element's opposing external surface traveling through the dry opacifying layer.

The terms "porous particle" and "porous particles" are used herein, unless otherwise indicated, to refer to porous organic polymeric materials useful in the foamable aqueous compositions, foamed aqueous compositions, dry foamed compositions, and foamed, opacifying elements. The porous particles generally comprise a solid continuous polymeric phase having an external particle surface and discrete pores dispersed within the continuous polymeric phase. The continuous polymeric phase also can be chemically crosslinked or elastomeric in nature, or both chemically crosslinked and elastomeric in nature.

The continuous polymeric phase of the porous particles generally has the same composition throughout that solid phase. That is, the continuous polymeric phase is generally uniform in composition including any additives (for example, colorants) that can be incorporated therein. In addition, if mixtures of polymers are used in the continuous polymeric phase, generally those mixtures also are dispersed uniformly throughout.

As used in this disclosure, the term "isolated from each other" refers to the different (distinct) pores of same or different sizes that are separated from each other by some of the continuous polymeric phase, and such pores are not generally interconnected.

The terms "first discrete pore" and "second discrete pore" refer to distinct sets of isolated pores in the porous particles useful in the present invention. These first and second discrete pores refer to distinct sets of pores. Each distinct set of pores includes a plurality of pores that are isolated from each other, and the pores of each set of pores are isolated from all other pores of the other sets of pores in the porous particle. Each set of pores can have the same mode average size or both sets can have the same mode average size. The word "discrete" is also used to define different droplets of the first and second aqueous phases when they are suspended in the oil (solvent) phase used for making the porous particles.

The porous particles can include "micro," "meso," and "macro" discrete pores that, according to the International Union of Pure and Applied Chemistry, are the classifications recommended for discrete pore sizes of less than 2 nm, from 2 nm to 50 nm, and greater than 50 nm, respectively. Thus, while the porous particles can include closed discrete pores of all sizes and shapes (that is, discrete pores entirely within the continuous polymeric phase) providing a suitable volume in each discrete pore, macro discrete pores are particularly useful. While there can be open macro pores on the surface of the porous particle, such open pores are not desirable and may be present only by accident. The size of the porous particle, the formulation, and manufacturing conditions are the primary controlling factors for discrete pore size. However, typically the discrete pores independently have an average size of at least 100 nm and up to and including 7,000 nm, or more likely at least 200 nm and up to and including 2,000 nm. Whatever the size of the discrete pores, they are generally distributed randomly throughout the continuous polymeric phase. If desired, the discrete pores can be grouped predominantly in one part (for example, "core" or "shell") of the porous particles.

In some embodiments, where there are different sets of discrete pores, the discrete pores of a first set are predominantly nearer then external particle surface compared to the discrete pores of a second set. For example, a set of smaller discrete pores can be predominantly close to the external particle surface compared to a set of larger discrete pores. As used herein, the term "predominant" means that a larger number fraction of pores of one size is found in a "shell" area nearer the surface of the porous particle than one would expect based on the total number fraction of the two or more types (sizes) of pores present in the porous particle.

The porous particles used in this invention generally have a porosity of at least 20 volume % and up to and including 70 volume %, or likely at least 40 volume % and up to and including 65 volume %, or more typically at least 45 volume % and up to an including 60 volume %, all based on the total porous particle volume. Porosity can be measured using a mercury intrusion technique where mercury crushes the closed pores at high pressure and the volume of (irreversibly) crushed pores is used to measure porosity (pore volume). A high degree of separation in pressure is observed between the interstitial filling of mercury between the particles and pore crushing. The interstitial filling is a function of both particle size distribution and particle packing in the penetrometer, while the pore crushing signal is due to the compressibility of the particles as a function of wall thickness and variations in its modulus.

"Opacity" is a measured parameter of a foamed, opacifying element that characterizes the extent of transmission of electromagnetic radiation such as visible light. A greater opacity indicates a more efficient blocking (hiding) of predetermined radiation (as described below). In the present invention, the "opacity" of a foamed, opacifying element can be measured as the light-blocking value (LBV), as described below with the Examples, which determines the extent to which the impinging radiation or light is blocked by the foamed, opacifying element. The higher the LBV, the greater the light-blocking ability exhibited by the foamed, opacifying element. The articles of the present invention generally exhibit a LBV of at least 4.

Glass transition temperatures of the organic polymers used to prepare the continuous polymeric phase can be measured using Differential Scanning Calorimetry (DSC) using known procedures. For many commercially available organic polymers, the glass transition temperatures are known from the suppliers.

Polymer viscosity (in centipoises) for the continuous polymeric phase can be measured in ethyl acetate at a concentration of 20 weight % of the polymer at 25° C. in an Anton Parr MCR 301 stress rheometer in a coquette using steady shear sweeps. Shear rate at 100 sec$^{-1}$ was calculated from the resulting graphical plot of viscosity vs. shear rate.

CIELAB L*, a*, and b* values have the known definitions according to CIE 1976 color space or later known versions of color space and were calculated assuming a standard D65 illuminant. The Y tristimulus value of the X, Y, and Z tristimulus values can be used as a measure of the luminous reflectance or "brightness" of a dry opacifying layer.

Unless otherwise indicated, the terms "thermal transfer process" and "heat transfer process" are intended to refer to the same sublimation or vapor-phase process of printing or dyeing textile fabrics wherein textiles are colored with thermal colorants that undergo sublimation at temperatures below that at which the physical integrity of the textile is impaired.

Uses

The foamable aqueous compositions and foamed aqueous compositions can be used to prepare foamed, opacifying elements that in turn can be used as radiation (light) blocking materials in the form of blackout liners, roller shades, privacy curtains, banners, and window shades for airplanes, hospitals, homes, labels, projection screens, textile fabrics, and packaging materials. The foamed, opacifying elements can also exhibit improved sound and heat blocking properties, and can have suitable images provides by thermal colorant transfer processes as described below for viewing on one or both sides. The term "blackout liner" is intended to include but not limited to, window curtains, shades for all purposes, draperies, room dividers, privacy curtains, and cubicle curtains suitable for various environments and structures.

Foamable Aqueous Compositions

The foamable aqueous compositions designed for use in the present invention can be suitably aerated to provide foamed aqueous compositions to prepare a foamed, opacifying element according to the present invention. In many embodiments, the foamable aqueous compositions have the following five essential components that are the only components needed to obtain the light-blocking properties and advantages described above: (a) porous particles as described below; (b) a binder material, also described below; (c) one or more additives as described below, comprising at least one surfactant; (d) water; and (e) an opacifying colorant different from all of the compounds of component (c), which opacifying colorant absorbs "predetermined electromagnetic radiation" (generally UV to near-IR, for example, absorbing the radiation of all wavelengths of from 350 nm to 800 nm or from 350 nm to and including 700 nm). Optional (non-essential) components that can be included are also described below.

The foamable aqueous composition generally has at least 35% and up to and including 70% solids, or more particularly at least 40% and up to and including 60% solids.

Porous Particles:

Porous particles used in the present invention containing discrete pores (or compartments) are used in the dry opacifying layers and they are generally prepared, as described below, using one or more water-in-oil emulsions in combination with an aqueous suspension process, such as in the Evaporative Limited Coalescence (ELC) process. The details for the preparation of the porous particles are provided, for example, in U.S. Pat. No. 8,110,628 (Nair et al.), U.S. Pat. No. 8,703,834 (Nair), U.S. Pat. No. 7,754,409 (Nair et al.), U.S. Pat. No. 7,887,984 (Nair et al.), U.S. Pat. No. 8,329,783 (Nair et al.), and U.S. Pat. No. 8,252,414 (Putnam et al.), the disclosures of all of which are hereby incorporated herein by reference. The porous particles are generally polymeric and organic in nature (that is, the continuous polymeric phase is polymeric and organic in nature) and non-porous particles (having less than 5% porosity) are excluded. Inorganic particles can be present on the outer surface as noted below.

The porous particles are composed of a continuous polymeric phase derived from one or more organic polymers that are chosen so that the continuous polymeric phase has a glass transition temperature ($T_g$) greater than 80° C., or more typically at least 100° C. and up to and including 180° C., or more likely at least 110° C. and up to and including 170° C. as determined using Differential Scanning Calorimetry. Polymers having a $T_g$ greater than 200° C. are typically less useful in the continuous polymeric phase.

In addition, the continuous polymeric phase comprises one or more polymers each of which has a viscosity of at least 80 centipoises (0.080 mPa sec) and up to and including 500 centipoises (0.5 mPa sec) at a shear rate of 100 sec$^{-1}$ as measured in ethyl acetate at a concentration of 20 weight % at 25° C. This feature is important to optimize the preparation of porous particles used in the practice of this invention so that the prepared porous particles have a narrow particle size distributions and high porosity.

For example, the continuous polymeric phase can comprise one or more polymers having the properties noted above, wherein generally at least 70 weight % and up to and including 100 weight % based on the total polymer weight in the continuous polymeric phase, is composed of one or more cellulose polymers (or cellulosic polymers) including but not limited to, those cellulosic polymers derived from one or more of cellulose acetate, cellulose butyrate, cellulose acetate butyrate, and cellulose acetate propionate. A polymer derived solely from cellulose acetate butyrate is particularly useful. Mixtures of these cellulose polymers can also be used if desired, and mixtures comprising a polymer derived from cellulose acetate butyrate as at least 80 weight % of the total of cellulose polymers (or of all polymers in the continuous polymeric phase) are particularly useful mixtures.

In general, the porous particles used in the present invention have a mode particle size equal to or less than 50 µm, or of at least 2 µm and up to and including 50 µm, or typically of at least 3 µm and up to and including 30 µm or even up to and including 40 µm. Most useful porous particles have a mode particle size of at least 3 µm and up to and including 20 µm. Mode particle size represents the most frequently occurring diameter for spherical particles and the most frequently occurring largest diameter for the non-spherical particles in a particle size distribution histogram.

Pore stabilizing materials such as hydrocolloids can be present within at least part of the volume of the discrete pores distributed throughout the continuous polymeric phase, which pore stabilizing materials are described in patents cited above. In some embodiments, the same pore stabilizing material is incorporated in essentially all discrete pores throughout the entire porous particles. In many embodiments, the pore stabilizing hydrocolloids are selected from the group consisting of carboxymethyl cellulose (CMC), a gelatin, a protein or protein derivative, polyvinyl alcohol and its derivatives, a hydrophilic synthetic polymer, and a water-soluble microgel.

It can be desired in some embodiments to provide additional stability of one or more discrete pores in the porous particles during their formation, by having one or more amphiphilic block copolymers disposed at the interface of the one or more discrete pores and the continuous polymeric phase. Such materials are "low HLB," meaning that they have an HLB (hydrophilic-lipophilic balance) value as it is calculated using known science, of 6 or less, or even 5 or less. The details of these amphiphilic polymers and their use in the preparation of the porous particles are provided in U.S. Pat. No. 9,029,431 (Nair et al.), the disclosure of which is hereby incorporated herein by reference.

A particularly useful amphiphilic block copolymer useful in such embodiments comprises poly(ethyleneoxide) and poly(caprolactone) that can be represented as PEO-b-PCL. Amphiphilic block copolymers, graft copolymers and random graft copolymers containing similar components are also useful.

Such an amphiphilic block copolymer can be generally present in the porous particles in an amount of at least 1 weight % and up to and including 99.5 weight %, or at least 2 weight % and up to and including 50 weight %, based on total porous particle dry weight.

The porous particles used in this invention can be spherical or non-spherical depending upon the desired use. In a method used to prepare the porous particles, additives (shape control agents) can be incorporated into the first or second aqueous phases, or in the oil (organic) phase to modify the shape, aspect ratio, or morphology of the porous particles. The shape control agents can be added prior to or after forming the water-in-oil-in-water emulsion. In either case, the interface at the oil and second water phase is modified before organic solvent is removed, resulting in a reduction in sphericity of the porous particles. The porous particles used in the present invention can also comprise surface stabilizing agents, such as colloidal silica, on the outer surface of each porous particle, in an amount of at least 0.1 weight %, based on the total dry weight of the porous particle.

The average size of the discrete pores (or individually isolated and closed voids or compartments) is described above.

The porous particles can be provided as powders, or as aqueous suspensions (including water or water with water-miscible organic solvents such as alcohols). Such powders and aqueous suspensions can also include surfactants or suspending agents to keep the porous particles suspended or when rewetting them in an aqueous medium. A useful surfactant for this purpose, for example is a $C_{12}$-$C_{14}$ secondary alcohol derivative of poly(ethylene oxide) that can be commercially available as TERGITOL® 15-S-7 (Dow Chemical Corporation). The other compositional features are described in the incorporated description of methods for preparing the porous particles.

The porous particles are generally present in the foamable aqueous composition in an amount of at least 0.05 weight % and up to and including 15 weight %, or typically at least 0.5 weight % and up to and including 10 weight %, based on the total weight of the foamable aqueous composition (including water that is present), particularly when the porous particles have a mode size of at least 3 µm and up to and including 30 µm.

It is known in the art, that typical white inorganic pigments such as titanium dioxide block electromagnetic radiation by light scattering as a result of refractive index differences between the inorganic pigment particles and the surroundings influenced by the pigment particle size. Additionally, there is only so much volume that can be filled (0.635 of random close packing of monodispersed spheres) before interstitial cavities form between packed pigment particles.

The opacity of an opacifying layer is enhanced by interstitial voids that are formed when the particle volume concentration (PVC), typically pigment particles such as titanium dioxide, is above a critical level. The sizes of the interstitial voids for example between the pigment particles are smaller than the pigment particles themselves and decrease with increasing polydispersity of such pigment particles. Since the pigment particle sizes are optimized for maximum light scattering when dispersed in a polymeric matrix above the critical PVC, the interstitial voids created by the pigment particles will be too small to also optimally scatter light. Crowding occurs when the spacing between pigment particles decreases to the point where the light scattering becomes dependent on the concentration of the pigment particles and the effectiveness of scattering by the pigment particles is reduced as the pigment loading is increased. This is known as "dependent scattering," a phenomenon whereby the effective scattering diameter, or scattering zones, of pigment particles become effectively greater than their actual diameter. These scattering zones overlap as the concentration of scattering pigment particles increases, reducing scattering efficiency, and resulting in the crowding effect. Small and large pigment particle size extenders have been used to create greater separation between the scattering pigment particles and to reduce the overlap of the scattering zones to result in greater scattering efficiency and opacity.

Advantageously, for the porous particles used in the present invention, the spacing between the light scattering discrete pores within the porous particles is controlled during the process of forming them and is not subject to subsequent formulation effects such as dependent scattering effects.

Optimal dry opacifying layers designed according to the present invention comprise: porous particles containing a small amount of an opacifying colorant as described below to enhance the light-blocking capacity of the porous particles (particularly transmitted light-blocking capacity); a binder material to hold the porous particles in place; and surfactants and other additives including optionally one or more tinting colorants that can be in other porous particles or dispersed within the layer. The foamed aqueous composition used to prepare the dry opacifying layer comprises foam cells that surround the porous particles.

Upon drying the foamed aqueous composition, the large mismatch in refractive index between the discrete pores of the porous particles in the dry opacifying layer and the polymer walls (continuous polymeric phase), and the dried foam cells, causes incident electromagnetic radiation passing through the dry opacifying layer to be scattered by the multiplicity of interfaces and discrete pores. The back scattered electromagnetic radiation can again be scattered and returned in the direction of the incident electromagnetic radiation thus reducing the attenuation and contributing to the opacifying power and brightness or luminous reflectance of the dry opacifying layer. If a small amount of electromagnetic radiation absorbing opacifying colorant is present in the porous particles of the dry opacifying layer, for example either in the discrete pores or in the continuous polymer phase of the porous particles, the opacifying power of the dry opacifying layer is increased. This is because the multiple scattering of electromagnetic radiation in the dry opacifying layer increases the path length of the electromagnetic radiation through the dry opacifying layer, thereby increasing the chance that the electromagnetic radiation will encounter the opacifying colorant in the dry opacifying layer and be blocked or absorbed by it.

A single dry opacifying layer present in embodiments of the present invention comprises porous particles and a relatively low amount of a predetermined electromagnetic radiation absorbing opacifying colorant such as carbon black for creating electromagnetic radiation blocking coatings and the dry foam cells surrounded by the binder material. Multiple light scattering effects by and among the porous particles and the surrounding dry foam cells, increase the path of the radiation through the dry opacifying layer. The likelihood of radiation encountering an opacifying colorant is increased by this greater path length.

Some particularly useful porous particles comprise a continuous polymeric phase and a first set of discrete pores dispersed within the continuous polymeric phase, wherein:

each porous particle has a mode particle size of at least 3 µm and up to and including 30 µm, each porous particle has a porosity of at least 40 volume % and up to and including 65 volume %, the continuous polymeric phase comprises one or more polymers, at least 70 weight % of which are derived from one or more of cellulose acetate, cellulose butyrate, cellulose acetate butyrate, and cellulose acetate propionate such that the continuous polymeric phase has a glass transition temperature ($T_g$) of at least 110° C. and up to and including 170° C. as determined using Differential Scanning Calorimetry, the average size of the discrete pores is at least 50 nm and up to and including 1000 nm, the porous particles further comprise a pore stabilizing hydrocolloid within at least part of the volume of the discrete pores, which pore stabilizing hydrocolloid is selected from the group consisting of carboxymethyl cellulose, a gelatin, a protein or protein derivative, polyvinyl alcohol or a derivative thereof, a hydrophilic synthetic polymer, and a water-soluble microgel, and the porous particles comprise one or more amphiphilic low HLB block copolymers disposed at the interface of one or more of the discrete pores and the continuous polymeric phase.

Binder Materials:

The foamable and foamed aqueous compositions used in the present invention also comprise one or more binder materials that can behave as a "matrix" for all materials to hold the essential porous particles, additives, opacifying colorants, and any optional materials together upon application to the internal surface of the porous substrate and drying to form a dry opacifying layer.

It is particularly useful that the binder material have the following properties: (a) it is water-soluble or water-dispersible; (b) it is capable of forming a stable foamed aqueous composition with the essential and optional components described herein; (c) it is capable of being disposed onto a suitable substrate as described below; (d) it does not inhibit the aeration (foaming) process (described below); (e) it is capable of being dried and where desired also crosslinked (or cured); (f) it has good light and heat stability; (g) it is film-forming but contributes to the flexibility of the foamed, opacifying element and is thus not too brittle, for example having a $T_g$ of less than 25° C.

The choice of binder material can also be used to increase the laundering properties of the resulting foamed opacifying compositions in the foamed, opacifying elements. In addition, the binder material can be used to provide a supple feel to touch and flexibility especially when disposed on a porous substrate (for example, a fabric) that is meant for window coverings such as draperies. The binder material is useful in the foamed, opacifying element for binding together and adhering the porous particles and other materials in the dry foamed composition onto the porous substrate.

The binder material can include one or more organic polymers that are film forming and that can be provided as an emulsion, dispersion, or an aqueous solution, and that cumulatively provide the properties noted above. It can also include polymers that are self-crosslinking or self-curable, or it can include one or more polymers to which crosslinking agents are added and are thus curable or capable of being crosslinked (or cured) under appropriate conditions.

Thus, if the binder material is crosslinkable (or curable) in the presence of a suitable crosslinking agent, such crosslinking (or curing) can be activated chemically with heat, radiation, or other known means. A curing or crosslinking agent serves to provide improved insolubility of the resulting dry foamed composition, cohesive strength, and adhesion to the porous substrate. The curing or crosslinking agent is generally a chemical having functional groups capable of reacting with reactive sites in a binder material (such as a functionalized latex polymer) under curing conditions to thereby produce a crosslinked structure. Representative crosslinking agents include but are not limited to, multi-functional aziridines, aldehydes, methylol derivatives, and epoxides.

Useful binder materials include but are not limited, to poly(vinyl alcohol), poly(vinyl pyrrolidone), ethylene oxide polymers, polyurethanes, urethane-acrylic copolymers, other acrylic polymers, styrene-acrylic copolymers, vinyl polymers, styrene-butadiene copolymers, acrylonitrile copolymers, polyesters, silicone polymers, or a combination of two or more of these organic polymers. Such binder materials are readily available from various commercial sources or can be prepared using known starting materials and synthetic conditions. The binder material can be anionic, cationic or nonionic in net charge. A useful class of film-forming binder materials includes aqueous latex polymer dispersions such as acrylic latexes that can be ionic or nonionic colloidal dispersions of acrylate polymers and copolymers. For example, useful film-forming aqueous latexes include but are not limited to, styrene-butadiene latexes, poly(vinyl chloride) and poly(vinylidene chloride) latexes, poly(vinyl pyridine) latexes, poly(acrylonitrile) latexes, and latexes formed from N-methylol acrylamide, butyl acrylate, and ethyl acrylate. Examples of suitable commercially available binder materials include those sold by DSM under the trade names NEOREZ® A-1150, NEOCRYLs A-6093, by Dow under the trade name RHOPLEX® NW-1845K and by BASF under the tradenames BUTOFAN® N S144, and BUTOFAN® NS 222, by Lubrizol under the tradenames HYSTRETCH® and HYCAR®, and resins sold by Royal Adhesives such as PARANOL® AC-2032.

The binder material generally has a glass transition temperature that is less than 25° C., and more likely equal to or less than 0° C. Glass transition temperature can be determined using known procedures and such values are already known for many polymers useful as binder materials in this invention. The binder material desirably has adequate flexibility and tensile strength to maintain integrity upon handling, especially for use with porous textile substrates.

The one or more binder materials can be present in the foamable aqueous composition in an amount of at least 20 weight %, or at least 20 weight % and up to and including 60 weight %, or typically at least 30 weight % and up to and including 50 weight %, based on the total foamable aqueous composition (that is, the total weight of all components including water).

Additives:

The foamable aqueous compositions can include at least 0.0001, or at least 0.001 weight %, or even at least 0.01 weight %, and up to and including 2 weight %, or up to and including 5 weight %, or even up to and including 20 weight %, or even at least and including 30 weight % of one or more additives comprising at least one surfactant as defined below. Other useful additives include but are not limited to plasticizers, inorganic or organic pigments and dyes (for example, pigment or dye colorants different from the opacifying colorants described below), flame retardants, biocides, fungicides, antimicrobial agents, preservatives, pH buffers, optical brighteners, tinting colorants, metal particles such as metal platelets or metal flakes, thickeners, and inorganic fillers (such as clays) that are not any of the other additive materials or opacifying colorants described below. These amounts refer to the total of the one or more additives in the foamable aqueous composition and are based on the total weight of those compositions (including water). There can be mixtures of each type of additive, or mixtures of two or more types of additives in each of these compositions.

Any of these additives or mixtures thereof, can be present within any location of the foamed aqueous composition, including but not limited to: the continuous polymeric phase; a volume of the first set (or other set) of discrete pores; or both the first set (or other set) of discrete pores and the continuous polymeric phase of the porous particles. Alternatively, the one or more additives can be present within the binder material alone, or both within the binder material and within the porous particles.

In all embodiments, the (c) additives useful in the present invention are not the same compounds as the (a) porous particles, (b) binder materials, and (d) opacifying colorants as described herein.

As noted above, at least one additive is a surfactant that is defined as a compound that reduces surface tension in a composition. In most embodiments of this invention, this essential surfactant is a foaming agent that functions to create and enhance foam formation. In many such embodiments, the one or more (c) additives comprise one or more foaming agents (surfactants) as well as one or more foam stabilizing agents that are also surface active agents that function to structure and stabilize the foam. Examples of useful foaming agents (surfactants) and foam stabilizing dispersing agents include but are not limited to, ammonium stearate, sodium lauryl sulfate, ammonium lauryl sulfate, ammonium sulfosuccinate, disodium stearyl sulfosuccinate, ethoxylated alcohols, ionic, nonionic or anionic agents such as fatty acid soaps or a fatty acid condensation product with an alkylene oxide, for example, the condensation product of ethylene oxide with lauryl or oleic acid or an ester of fatty alcohols and similar materials, many of which can be obtained from various commercial sources. Mixtures of foaming agents can be used if desired.

The relative amounts of each of these two types of (c) additives is not critical as long as the desired function is evident, that is suitable foaming properties as required to prepare the foamed aqueous composition of the present invention, and stability of that foamed aqueous composition during storage and manufacture of the foamed, opacifying elements. The optimal amounts of each of these additives can be determined by using routine experimentation and the teaching in the working Examples below.

Other useful (c) additives include metal particles that can be obtained from any available commercial source as metal flakes or metal platelets and in dry form or as a suspension. Such metal flakes or metal platelets are substantially 2-dimensional particles, having opposing main surfaces or faces separated by a relatively minor thickness dimension. The metal flakes can have a size range of at least 2 μm and up to and including 50 μm in main surface equivalent circular diameter (ECD) wherein the ECD is the diameter of a circle having the same area as the main face. Examples of useable metal flakes include those available from Ciba Specialty Chemicals (BASF) such as aluminum flakes that are available as METASHEEN 91-0410 in ethyl acetate, and copper flakes that can be obtained from various commercial sources. Further details of useful metal flakes are provided in Cols. 11-12 of U.S. Pat. No. 8,614,039 (Nair et al.), the disclosure of which is hereby incorporated herein by reference. The metal particles described above, and particularly the metal flakes can be in the foamable aqueous composition in any suitable location but they are particularly useful when incorporated within the porous particles such as within the volume of the discrete pores of the porous particles.

Useful biocides (that is, antimicrobial agents or antifungal agents) that can be present as (c) additives include but are not limited to, silver metal (for example, silver particles, platelets, or fibrous strands) and silver-containing compounds such as silver chelates and silver salts such as silver sulfate, silver nitrate, silver chloride, silver bromide, silver iodide, silver iodate, silver bromate, silver tungstate, silver phosphate, and silver carboxylates. In addition, copper metal (for example, copper particles, platelets, or fibrous strands) and copper-containing compounds such as copper chelates and copper salts can be present as (c) additives for biocidal purposes. Mixtures of any of silver metal, silver-containing compounds, copper metal, and copper-containing compounds, can also be present and used in this manner.

It can also be useful to include thickeners as (c) additives to modify the viscosity of the foamable aqueous composition and to stabilize it as long as aeration is not inhibited. A skilled worker can optimize the viscosity so as to obtain optimal aeration conditions and desired foam density as described below. Useful thickeners can be utilized to control the rheology of the foamable aqueous composition depending upon the method used to form the dry opacifying layer on a porous substrate as described below. Particularly useful rheology modifiers are RHEOVIS® PU 1214 (BASF) and ACRYSOL® G111 (Dow Chemical Company).

Particularly useful (c) additives comprise one or more tinting colorants that can be used to provide a specific observable color, coloration, or hue in the resulting foamed, opacifying elements. These materials are not chosen to provide the opacifying property described below for the opacifying colorants and thus, tinting colorants are intended to be different materials than the opacifying colorants.

Mixtures of tinting colorants can be present in the foamable aqueous compositions and they can be different in composition and amount from each other. The desired coloration or hue can be obtained using specific tinting colorants can be used in combination with opacifying colorant(s) described below to offset or modify the original color of a foamed, opacifying element (without such materials) to provide more whiteness (or brightness) in the final "color" (or coloration). The one or more tinting colorants can be incorporated within the porous particles (either within the volume of discrete pores, within the continuous polymeric phase, or in both places) or they can be uniformly dispersed within the binder material. In some embodiments, a tinting colorant can be incorporated within the same porous particles that also include an opacifying colorant (as described below). Alternatively, one or more tinting colorants can be present within both the porous particles (in a suitable location) and within the binder material.

In some embodiments, a first population of porous particles described herein comprising opacifying colorants as described below, and another population of porous particles described herein comprising tinting colorants can be mixed with the first population of porous particles. The two sets of porous particles can comprise the same or different polymers in the continuous polymeric phase.

The one or more tinting colorants can be present in the foamable aqueous composition in an amount of at least 0.0001 weight %, or more typically at least 0.001 weight %, and up to and including 3 weight %, based on the total weight of the foamable aqueous composition (including water). Tinting colorants can be dyes or organic pigments that are soluble or dispersible in organic solvents and polymers that are used for making the porous particles and thus can be included within the oil phase used to prepare such porous particles. Alternatively, the tinting colorants can be primarily water-soluble or water-dispersible materials and included into an aqueous phase used to prepare the porous particles.

It can also be useful to include one or more optical brighteners as (c) additives to increase the whiteness (brightness or "fluorescent" effect) of the final coloration in the foamed, opacifying element. Optical brighteners are sometimes known in the art as "fluorescent whiteners" or "fluorescent brighteners." In general, such materials are organic compounds selected from classes of known compounds such as derivatives of stilbene and 4,4'-diaminostilbene (such as bistriazinyl derivative); derivatives of benzene and biphenyl (such as styril derivatives); pyrazolines; derivatives of bis (benzoxazole-2-yl); coumarins; carbostyrils; naphthalimides; s-triazines; and pyridotriazoles. Specific examples of optical brighteners can be found in various publications including "Fluorescent Whitening Agents," Kirk-Othmer *Encyclopedia of Chemical Technology, Fourth Edition*, volume 11, Wiley & Sons, 1994. One of more of such compounds can be present in an amount of at least 0.01 weight % and up to and including 2 weight %, all based on the total weight of the foamable aqueous composition.

When present, one or more optical brighteners can be in one or more locations in the foamable aqueous composition. For example, an optical brightener can be present in the binder material. Alternatively, an optical brightener can be present within: the continuous polymeric phase of the porous particles; a volume of the discrete pores in the porous particles; or both in a volume of the discrete pores and the continuous polymeric phase, of the porous particles.

In many useful embodiments, the (c) additives comprise two or more materials selected from surfactant that is a foaming agent, a foam stabilizing agent, a tinting agent, an optical brightener, flame retardants, an antimicrobial agent, and an inorganic filler (such as a clay).

(d) Water:

Water is the primary solvent used in the foamable aqueous compositions used in the present invention. By "primary" is meant that of the total weight of solvents, water comprises at least 75 weight %, and more likely at least 80 weight % and up to and including 100 weight % of the total solvent weight. Auxiliary solvents that can be present must not adversely affect or harm the other components in the composition, namely the porous particles, binder materials, one or more additives, and opacifying agents. Nor must such auxiliary solvents adversely affect formation of the foamable aqueous composition or its use to prepare a foamed, opacifying element. Such auxiliary solvents can be water-miscible organic solvents such as alcohols and ketones.

The solvents then, primarily water, comprise at least 30 weight % and up to and including 65 weight %, or typically at least 40 weight % and up to and including 60 weight %, of the total weight of the foamable aqueous composition.

(e) Opacifying Colorants:

The opacifying colorants used in the present invention can be a single colorant or chosen from any suitable combination of colorants such that the single or multiple colorants form the "opacifying colorant" that absorbs predetermined electromagnetic radiation (defined above) to provide blackout properties (or suitable opacity). Opacifying colorants can be soluble dyes or pigments or combinations of each or both types of materials. The opacifying colorants are different from all compounds defined above as the (c) additives.

In most embodiments, the one or more opacifying colorants are present within a volume of the first set (or another set) of discrete pores within the porous particles, within the continuous polymeric binder of the porous particles, or within both the volume of the first set (or another set) of discrete pores and the continuous polymeric binder of the porous particles. This is highly advantageous as the porous particles can be used to "encapsulate" various opacifying colorants as well as tinting colorants and other (c) additives so they are kept isolated from the other components of the foamable aqueous composition and are additionally not exposed to the environment during sewing or upon surface damage of the foamed, opacifying element. However, in some embodiments, it can be useful to incorporate opacifying agents solely or additionally within the binder material in which the porous particles are dispersed.

As used herein, an "opacifying colorant" includes one or more colorant materials that are chosen, individually or in combination, to provide the blocking of predetermined electromagnetic radiation (as described above). While the opacifying colorants can provide some coloration or desired hue, they are not purposely chosen for the purpose and are thus materials that are chosen to be different from the tinting colorants described above.

Examples of opacifying colorants that can be used individually or in combination include but are not limited to, neutral or black pigments or dyes, a carbon black, black iron oxide, graphite, aniline black, anthraquinone black, and combinations of colored pigments or dyes such as combinations of two or more cyan, magenta, green, orange, blue, red, and violet dyes. The present invention is not limited to only the specific opacifying colorants described herein but these are considered as representative and as suitable guidance for a skilled worker to devise other combinations of opacifying colorants for the desired absorption in the predetermined electromagnetic radiation. A carbon black or a neutral or black pigment or dye (or combination thereof) is particularly useful as an opacifying colorant, of which there are many types available from commercial sources. Combinations of dyes or pigments such as a combination of the subtractive primary colored pigments (cyan, magenta, and yellow colored pigments) can also be used to provide a "black" or visually neutral opacifying colorant.

The opacifying colorant can be generally present in the foamable aqueous composition in an amount of at least 0.001 weight % and up to and including 0.5 weight %, or at least 0.003 weight % and up to and including 0.2 weight %, all based on the total weight of the foamable aqueous composition (including the weight of solvent). These amounts refer to the total amount of one or a mixture of opacifying colorants. For example, as noted above, an opacifying colorant can comprise a combination of two or more component colorants (such as a combination of dyes or a combination of pigments) designed in hues and amounts so that the combination meets the desired properties described herein.

In some embodiments, the opacifying colorant is a carbon black that is present in an amount of at least 0.003 weight % and up to and including 0.2 weight %, based on the total weight of the foamable aqueous composition.

In some embodiments, the opacifying colorants, if in pigment form, can be milled to a fine particle size and then encapsulated within the volume of the discrete pores of the porous particles by incorporating the milled pigment within an aqueous phase used in making the porous particles. Alternatively, the opacifying colorant can be incorporated within the continuous polymeric phase of the porous particles by incorporating the opacifying colorant in the oil phase used in making the porous particles. Such arrangements can be achieved during the manufacture of the porous particles using the teaching provided herein and teaching provided in references cited herein.

In some embodiments, it can be useful to incorporate or dispose at least 95% (by weight) of the total opacifying colorant (or combination of component colorants) within the porous particles (either in the volume of the discrete pores, continuous polymeric phase, or both), and to incorporate the remainder, if any, within the binder material. However, in many embodiments, 100 weight % of the opacifying colorant is incorporated within the porous particles. For example, more than 50 weight % of the total opacifying colorant can be disposed or incorporated within the continuous polymeric phase of the porous particles, and the remainder can be incorporated within the volume of the discrete pores.

The opacifying colorants useful in the practice of this invention can be incorporated into the volume of the discrete pores of individual porous particles for example, by incorporating them in a first water phase to form a water-in-oil emulsion or in the continuous polymeric phase of the individual porous particles by incorporating them in the oil phase. In some embodiments, an opacifying colorant can be incorporated into the first aqueous phase in the form of a milled solid particle dispersions of the opacifying colorant. Preparation of milled solid particle dispersions can include combining the opacifying colorant particles to be reduced in size with a dispersant and a liquid medium such as water or ethyl acetate (when the opacifying colorant is incorporated in the continuous polymeric phase of the particle) in which the porous particles are to be dispersed, in a suitable grinding mill in which the porous particles are reduced in size and dispersed. The dispersant, an important ingredient in the milling, can be chosen to allow the opacifying colorant particles to be milled in the liquid medium down to a size small enough for incorporation into the discrete pores of the porous particles. The dispersants can be selected to obtain efficient opacifying colorant particle size reduction during milling, provide good colloidal stability of the opacifying colorant particles to prevent agglomeration after milling and impart the desired properties of the final foamed aqueous composition containing the opacifying colorants and the porous particles containing them. Alternatively, the opacifying colorant also can be incorporated in the continuous polymeric phase as a master batch of the opacifying colorant and an appropriate resin.

Foamed Aqueous Compositions

Foamed aqueous compositions can be prepared using the procedures described below wherein an inert gas (such as air) is mechanically incorporated into the foamable aqueous composition as described above, which procedures are designed to provide a foam density of at least 0.1 g/cm$^2$ and up to and including 0.5 g/cm$^3$, or more likely of at least 0.15 g/cm$^3$ and up to and including 0.4 g/cm$^3$. Foam density can be determined gravimetrically by weighing a known volume of the foamed aqueous composition.

The foamed aqueous composition generally has at least 35% solids and up to and including 70% solids, or more particularly at least 40% solids and up to and including 60% solids.

The essential components (a) through (e) of the foamed aqueous composition are generally present in the same amounts as in the foamable aqueous composition (described above) as the foaming process does not appreciably add to or diminish the amounts of such components.

For example, the (a) porous particles (as described above) can be present in the foamed aqueous composition in an amount of at least 0.05 weight % and up to and including 15 weight %, or typically of at least 0.5 weight % and up to and including 10 weight %, based on the total weight of the foamed aqueous composition.

One or more (b) binder materials (as described above) can be present in an amount of at least 20 weight %, or at least 25 weight % and up to and including 70 weight % or typically of at least 30 weight % and up to and including 50 weight %, based on the total weight of the foamed aqueous composition. In addition, one or more of the binder materials in the foamed aqueous composition can be curable.

One or more (c) additives (as described above) can be present in an amount of at least 0.0001 weight % and up to and including 30 weight % or typically of at least 0.001 weight %, or even at least 0.01 weight %, and up to and including 20 weight %, based on the total weight of the foamed aqueous composition. At least one of the (c) additives is a surfactant as described above, and in particularly useful embodiments, the (c) additives comprise a foaming agent and a foam stabilizing agent. Other useful (c) additives can be present as noted above for the foamable aqueous compositions, also in the amounts noted above. For example, some particularly useful embodiments of the foamed aqueous composition, the (c) additives comprise two or more materials selected from surfactant that is a foaming agent, a surfactant that is a foam dispersing agent, a tinting agent, an optical brightener, a flame retardant, an antimicrobial agent, and an inorganic filler (such as a clay).

Component (d), water, is also present as the predominant solvent (at least 75 weight % of total solvent weight), and all solvents that are present in an amount of at least 30 weight % and up to and including 70 weight %, or typically at least 40 weight % and up to and including 60 weight %, based on the total weight of the foamed aqueous composition.

The (e) opacifying colorants (as described above) are generally present in any suitable amount to provide the desired appearance, coloration, and opacity in the resulting foamed (and dried) opacifying element. In many embodiments, the one or more opacifying colorants can be present in an amount of at least 0.001 weight % or at least 0.001 weight % and up to and including 0.5 weight %, or even in an amount of at least 0.003 weight % and up to and including 0.2 weight %, especially when the opacifying colorant is a carbon black, all weights based on the total weight of the foamed aqueous composition.

In some embodiments, the foamed aqueous composition comprises at least 0.5 weight % and up to and including 10 weight % of the porous particles (as described above) that have a mode particle size of at least 3 µm and up to and including 30 µm, the amount based on the total weight of the foamed aqueous composition. In addition, discrete pores in such porous particles can have an average pore size of at least 100 nm and up to and including 7000 nm.

Moreover, the foamed aqueous composition can further comprise at least 0.001 weight % of the opacifying colorant (described above) within the porous particles. For example, some opacifying colorant can be a carbon black and present in an amount of at least 0.003 weight % and up to and including 0.2 weight % based on the total weight of the foamed aqueous composition.

Such opacifying colorant can be within: (i) the continuous polymeric phase of the porous particles; (ii) a volume of the discrete pores; or (iii) both the volume of the discrete pores and the continuous polymeric phase of the porous particles.

In some embodiments of the foamed aqueous composition, porous particles can be used that further comprise at least a second set of discrete pores (different from a "first" set of discrete pores) and an opacifying colorant or a tinting colorant can be present within: the continuous polymeric phase, the volume of the second set of discrete pores, or in both the continuous polymeric phase and the volume of the second set of discrete pores. First and second sets (or additional sets) of discrete pores can be incorporated into the porous particles using manufacturing technology described in several references cited above, including U.S. Pat. No. 8,110,628 (Nair et al.).

Foamed, Opacifying Elements

Foamed, opacifying elements according to the present invention can be prepared using methods described below. Such articles comprise a porous substrate and at least one dry foamed composition disposed on the internal surface of the porous substrate to form a dry opacifying layer. As described in more detail, each porous substrate has two supporting (planar) sides, that is, an opposing external surface and internal surface as defined above).

Each dry foamed composition is derived from a foamed aqueous composition as described above. Each dry foamed composition comprises at least the essential components (a) through (e) described above, all of which and respective amounts are described in more detail above.

Component (a) porous particles are present in an amount of at least 0.1 weight % and up to and including 40 weight % or at least 0.5 weight % and up to and including 10 weight % of porous particles that are described in detail above, the amounts based on the total weight of the dry foamed composition, particularly when the porous particles have a mode particle size of at least 2 µm and up to and including 50 µm (or at least 3 µm and up to and including 30 µm) and the first set of discrete pores of the porous particles have an average pore size of at least 100 nm and up to and including 7,000 nm.

In addition, the dry foamed composition includes component (b) binder material in an at least partially cured or crosslinkable form, which is at least 10 weight % and up to and including 70 weight %, or at least 20 weight % and up to and including 60 weight % of one or more at least partially cured binder materials. Such at least partially cured binder materials are derived by at least partial curing or crosslinking (described below) of the binder materials described above. The noted amounts are based on the total weight of the dry foamed composition. Each of the one or more binder materials has a $T_g$ of 25° C. or less, or 0° C. or less.

One or more (c) additives, at least one is a surfactant, are present in an amount of at least 0.2 weight % and up to and including 50 weight %, or at least 1 weight % and up to and including 45 weight %, such additives being selected from the group consisting of foaming agents, foam stabilizing agents, plasticizers, inorganic or organic pigments and dyes (for example, pigment or dye colorants different from the opacifying colorants described below), flame retardants, antimicrobials, fungicides, preservatives, pH buffers, optical brighteners, tinting colorants, metal particles such as metal platelets or metal flakes, thickeners, and inorganic fillers (such as clays) that are not any of the other additive materials or opacifying colorants described herein, all of which additives are described in more detail above. The amounts are based on the total weight of the dry foamed composition. As noted above, most embodiments include at least one surfactant that is a foaming agent and at least one foam stabilizing agent.

Particularly useful one or more (c) additives comprise two or more materials selected from a foaming agent, a foam stabilizing agent, a tinting colorant, an optical brightener, a flame retardant, an antimicrobial agent, and an inorganic filler (such as a clay).

Thus, the foamed, opacifying element can comprise one or more tinting colorants as (c) additives in the dry foamed composition in an amount of at least 0.0001 weight % and up to and including 3 weight %, based on the total weight of the dry foamed composition. Such tinting colorant(s) can be present in at least the porous particles, and can be elsewhere also.

It is also useful to include one or more optical brighteners as (c) additives in an amount of at least 0.001 weight % and up to and including 0.4 weight %, based on the total weight of the dry foamed composition.

The dry foamed composition is "substantially" dry in nature, meaning that it comprises less than 5 weight %, or even less than 2 weight %, of aqueous medium (including water and any other solvents), based on the total weight of the dry foamed composition. This amount may not include any water that can be present in the discrete pores of the porous particles. The dry foamed composition in the dry opacifying layer generally comprises at least 90% solids, or at least 95% solids, or even at least 98% solids.

The dry foamed composition can also contain at least 0.002 weight %, or even at least 0.02 weight % and up to and including 2 weight % or up to and including 1 weight %, of one or more (e) opacifying colorants (as described above), which opacifying colorants absorb all wavelengths of the predetermined electromagnetic radiation (as defined above). Details of such opacifying colorants are described above, and the amounts are based on the total weight of the dry foamed composition. Such opacifying colorants can be present within the (a) porous particles or within the (b) binder material, or within both (a) and (b) components.

In some embodiments, a carbon black is present as the (e) opacifying colorant in an amount of at least 0.002 weight % and up to and including 1 weight %, based on the total weight of the dry foamed composition.

In many embodiments of the foamed, opacifying element, the opacifying colorant (such as a carbon black) can be present within: the continuous polymeric phase of the porous particles; a volume of the discrete pores; or both the volume of the discrete pores and the continuous polymeric phase of the porous particles.

The foamed, opacifying elements are designed particularly to have a single dry opacifying layer with the components disposed on the porous substrate so that the single dry opacifying layer in an element exhibits a light-blocking value (LBV) of at least 4 or more likely at least 5. For this purpose, light-blocking value can be determined as described above.

In addition, such dry opacifying layers exhibit a luminous reflectance (opacity) that is greater than 40%, as measured for the Y tristimulus value. For this purpose, luminous reflectance (brightness) is determined as described above.

Dry porous substrates useful in the practice of the present invention can comprise various porous materials such as knit, woven and nonwoven textile fabrics composed of polyester, polyamides, triacetate, acrylic, elastomers, nylon, or mixtures thereof, or knit, woven and nonwoven fabrics of cotton, linen, rayon, polyolefin, cotton, wool, porous glasses, fiberglass fabrics, or felt or mixtures thereof, or porous polymeric films [such as porous films derived from triacetyl cellulose, polyethylene terephthalate (PET), diacetyl cellulose, acetate butyrate cellulose, acetate propionate cellulose, polyether sulfone, polyacrylic based resin, for example, poly(methyl methacrylate), a polyurethane-based resin, polyester, polycarbonate, aromatic polyamide, polyolefins (for example, polyethylene and polypropylene), polymers derived from vinyl chloride (for example, polyvinyl chloride and a vinyl chloride/vinyl acetate copolymer), polyvinyl alcohol, polysulfone, polyether, polynorbornene, polymethylpentene, polyether ketone, (meth)acrylonitrile], porous paper or other porous cellulosic materials, canvases, porous wood, porous plaster and other porous materials that would be apparent to one skilled in the art. The porous substrates can vary in dry thickness as long as they are suitable for the desired foamed, opacifying element. In most embodiments, the dry porous substrate thickness is at least 50 µm.

Particularly useful porous substrates comprise a porous textile web (such as a flexible porous textile web) composed of synthetic materials such as polyester, nylon, acrylic materials, or synthetic blends with natural fibers.

Generally, the foamed, opacifying elements according to this invention are designed with a single dry opacifying layer disposed on the internal surface of the porous substrate as described above and such single dry opacifying layer can be the outermost layer disposed on the internal porous substrate. In some other embodiments, a dry non-opacifying layer can be disposed on the single dry opacifying layer, or it can be disposed on the opposing external surface of the porous substrate. Such a dry non-opacifying layer can be designed with any of the components (a) through (c) described above, but it does not comprise an (e) opacifying colorant as defined herein. Useful dry non-opacifying layers can be designed to have various functions such as coefficient of friction, texture and feel, antimicrobial properties, anti-blocking, and color modification.

Attractive finishes can be imparted to the foamed, opacifying element by for example, flocking the foamed aqueous composition that is disposed on the porous substrate. Flock or very short (0.2 mm and up to several mm) fibers can be disposed on the foamed aqueous composition either by electrostatic or mechanical techniques before or during drying.

Either the dry opacifying layer or dry non-opacifying layer can be treated with an anti-blocking agent such as a silicone, to reduce stickiness and to improve the surface coefficient of friction. Once applied, a blocking agent can be dried on the appropriate layer.

A thermal colorant image that is derived from a thermal colorant transfer process is disposed on at least the opposing external surface of the porous substrate, the dry opacifying layer, or on both the opposing external surface and the dry opacifying layer in the foamed, opacifying element. Details about providing such thermal colorant imaging are provided below.

Methods of Making Foamed, Opacifying Elements

The foamed, opacifying elements are prepared by firstly providing a dry opacifying layer from a foamable aqueous composition as described above comprising essential components (a) through (e) in the described amounts.

This foamable aqueous composition is aerated to provide a foamed aqueous composition having a foam density of at least 0.1 g/cm$^3$ and up to and including 0.5 g/cm$^3$, or of at least 0.15 g/cm$^3$ and up to and including 0.4 g/cm$^3$. This aeration procedure can be carried out using any suitable conditions and equipment that would be readily apparent to one skilled in the art in order to create a "foam" in the presence of a foaming agent as the (c) additive surfactant described above. For example, aeration can be carried out by mechanically introducing air or an inert gas (such as nitrogen or argon) in a controlled manner. High shear mechanical aeration can be carried out using sonication or high speed mixers, such as those equipped with a cowles blade, or with commercially available rotorstator mixers with interdigitated pins such as an Oakes mixer or a Hobart mixer, by introducing air under pressure or by drawing atmospheric air into the foamable aqueous composition by the whipping action of the mixer. Suitable foaming equipment can be used in a manner to provide the desired foam density with modest experimentation. It can be useful to chill or cool the foamable aqueous composition below ambient temperature to increase its stability by increasing its viscosity, and to prevent collapse of the foamed aqueous composition. This chilling operation can be carried out immediately before, after, or during the aeration procedure. Stability of the foamed aqueous composition can also be enhanced by the presence of a foam stabilizing agent as another of the (c) additives.

Once the foamed aqueous composition has been formed, it is typically disposed onto the internal surface of a suitable porous substrate (described above). This procedure can be carried out in any suitable manner that does not undesirably diminish the foam density (or foam structure) of the foamed aqueous composition. For example, the internal surface of the porous substrate can be coated with the aqueous foamed composition using any suitable known coating equipment (floating knife, hopper, blade, or gap) and coating procedures including but not limited to blade coating, gap coating, slot die coating, X-slide hopper coating, or "knife-over-flat" operation, especially if multiple layers are applied to the internal surface. If the dry opacifying layer is the only layer to be formed on the internal surface, the foamed aqueous composition can be applied using blade coating, gap coating, slot die coating, or "knife-over-flat" coating. For example, useful layer forming (coating) means are described in U.S. Pat. No. 4,677,016 (noted above), the disclosure of which is hereby incorporated herein by reference.

Thus, the foamed aqueous composition can be disposed directly onto the internal surface of the porous substrate ("directly" means no intervening or intermediate layers) such as a porous woven cloth fabric, a fiberglass fabric, a porous polyester fabric, or a cellulosic material.

When multiple layers are to be disposed on the internal surface of the porous substrate, a single dry opacifying layer can be disposed thereon and an outermost non-opacifying layer can be disposed on the dry opacifying layer using a suitable coating means as described above. Alternately, a non-opacifying layer can be disposed on the internal surface underneath the dry opacifying layer.

Once the foamed aqueous composition has been disposed on the internal surface of the porous substrate, it is dried to remove at least 95% of the original water, and at least partially cured (meaning the one or more binder materials are at least partially cured or crosslinked), simultaneously or in any order, to provide a dry foamed composition (and dry opacifying layer) on the internal surface of the porous substrate. Drying and at least partial curing can be accomplished by any suitable means such as by heating with warm or hot air, microwaves, or IR irradiation at a temperature and time sufficient for at least drying and at least partial curing (for example, at less than 180° C.). Curing the binder materials can be promoted by heat or radiation or other conditions to which the binder materials are responsive for crosslinking. In some embodiments, a suitable functionalized latex composition is used as the binder material. Upon heating, the binder material(s) dries, and a possible curing or crosslinking reaction takes place between reactive side groups of suitable curable polymer chains. If the particular binder material is not itself heat reactive, suitable catalysts or curing (crosslinking) agents can be added to the foamable aqueous composition to promote curing or crosslinking.

After drying and at least partially curing, the dry foamed composition on the internal surface is then crushed or densified to form a dry opacifying layer. This process can be carried out in any suitable manner but it is generally carried out by applying pressure to the dry foamed composition on the internal surface, for example, by passing the porous substrate with the dry foamed composition through a compression calendering operation, pressing operation, or embossing operation, or a combination thereof. For example, the foamed, opacifying element can be passed through a combination of calendering and embossing rollers to reduce the thickness of the dry foamed composition and to densify the foam. The thickness of the dry foamed composition can be reduced by at least 20% during such an operation. This process of crushing the dry foamed composition can be considered a "densifying operation" as the dry foamed composition is made denser while it is pressed together on the internal surface. The thickness of the dry foamed composition before and after crushing (densifying) can be determined by a known technique such as laser profilometry. After drying and crushing, the foamed, opacifying element generally has a light-blocking value (LBV) of at least 4, or at least 5, which LBV is determined as described above.

The crushing or densifying process described above can be carried out at any suitable temperature including room temperature (for example, 20° C.) and up to and including 90° C., or more likely at a temperature of at least 20° C. and up to and including 80° C.

After densifying the dry foamed composition, the dry opacifying layer can be subjected to conditions that promote further curing such as those conditions that are described above for the initial drying operations.

It is also possible to provide an embossed design on the outermost layer, for example, on the dry opacifying layer or on a dry non-opacifying layer during the densifying operation such as for example, by patterned embossing or calendering the dry outermost layer, to create selected regions of high or low opacity and thickness. The resulting embossed design can be viewed from either side in transmission.

Providing Thermal Dye Images

As described above, the foamed, opacifying elements according to the present invention comprise one or more thermal colorant images disposed on either the opposing external surface, the dry opacifying layer (on the internal surface), or both the opposing external surface and the dry opacifying layer. Each of these thermal colorant images is obtained using thermal colorant transfer processes that are described in more detail below. In most embodiments, the one or more thermal colorant images (such as thermal dye images) are provided on only the opposing external surface of the porous substrate.

In some embodiments, a thermal colorant image can be provided by a process that can be called "direct disperse dye printing" in which one or more thermal colorants are applied to a pretreated fabric substrate without the use of a thermal donor element and heated thereon to "thermofix" them into the pretreated fabric substrates.

In general, such thermal colorant images are provided by superposing a colorant donor layer of a thermal donor element (described below) and the surface of the foamed, opacifying element to be printed (or imaged). For example, the opposing external surface of the porous substrate and the colorant donor layer can be superposed, or the dry opacifying layer and the colorant donor layer can be superposed. In any of these arrangements, the desired thermal colorant image (pattern) is transferred by suitable application of heat, with or without pressure, that is directed to the superposed articles from the "backside" of the thermal donor element (thermal donor element support side opposite the colorant donor layer).

By the term "superposing" is meant that the colorant donor layer and the foamed, opacifying element are in intimate contact with little or no air gap.

Thermal donor elements useful in the practice of this invention can be provided in a variety of ways. For example, a thermal donor element can be obtained from a variety of commercial sources and such thermal donor elements typically comprise a suitable paper (cellulosic) or polymeric (such as polyester) support onto which a single- or multi-color image (or pattern) of one or more "inks" have been applied using inkjet printing, gravure printing, rotary screen printing, or other means. Such single- or multi-color image (or pattern) is provided as a "mirror" (negative) image or pattern so that the image or pattern provided on the foamed, opacifying element is a "positive" image or pattern.

In other embodiments, a thermal donor element can be provided like those commercially available from various sources worldwide. Such elements are sometimes referred to as thermal dye ribbons and have various colors that can be thermally printed, or they can have various colored dye patches on a single web or roll of thermal donor material. Each individual ribbon or patch comprises the appropriate sublimable dyes.

In such embodiments, the thermal colorant donor elements generally comprises a support having thereon a colorant donor layer (for example, a dye donor layer) comprising at least one thermally transferable colorant such as a sublimable dye or pigment. Such transferable composition can also be known as an "ink".

Many useful inks or dye colorants are known in the commercial trade or literature and the present invention is not limited to specific materials as long as they can be incorporated into a colorant dye donor layer and transferred to the foamed, opacifying element described above. Representative thermal donor elements can be constructed as described in U.S. Pat. No. 4,916,112 (Henzel et al.), U.S. Pat. No. 4,927,803 (Bailey et al.), U.S. Pat. No. 5,023,228 (Henzel), and U.S. Pat. No. 7,153,626 (Foster et al.), the disclosures of all of which are incorporated herein by reference.

In some of these embodiments, a thermal donor element can comprise a paper (cellulosic) or polymeric (such as polyester) support coating or inkjet printed image in a ribbon having sequential repeating areas (patches), or patterns or cyan, magenta, yellow, or black dye or ink. Thermal colorant transfer can be carried out sequentially or simultaneously to provide multi-color images.

As used herein, a thermally transferable "ink" can comprise one or more dyes, pigments, or other colorants and optionally one or more binder materials or carriers as would be readily apparent to one skilled in the art. Thermally transferable colorants such as dyes can be selected by taking into consideration of hue, lightfastness, solubility in any binder material, type of support, and thermal transfer conditions. Many examples of useful thermally transferable dyes are described in the references cited in [0115] of U.S. Patent Application Publication 2014/0071218 (Dontula et al.), the disclosure of which is incorporated herein by reference, including all US publications cited therein.

Useful thermally transferable colorants such as dyes can be employed singly or in combination and can be provided in a thermal donor element in an amount of at least 0.01 g/m$^2$ and up to and including 5 g/m$^2$, or more likely at least 0.05 g/m$^2$ and up to and including 2 g/m$^2$ based on the dry coverage of a colorant donor layer.

Representative sublimable dyes (inks) that can be used in the practice of this invention include Kiian Digistar E-Gold Sublimation Inks for Transfer Printing that can be applied to a substrate such as Kiian Digistar Paper using Epson piezo printheads in any desired pattern or image. The resulting thermal donor element can be used immediately or stored for later use. Thermal transfer of the ink from the thermal donor element to the foamed, opacifying element can be carried out using any suitable thermal transfer equipment such as a Practix OK-405 Rotary Transfer Machine that has a heated cylinder or calendaring roll against which the thermal donor element and desired surface of a porous substrate to be printed are superposed by means of an endless belt and in contact between the heated cylinder and the endless belt. In general, thermal transfer can be done with a heat press for sheets, or with a heated calendaring roller for rolls of material.

In many embodiments, image transfer can be accomplished by applying heat of at least 180° C. and up to and including 220° C., for example at 200° C., optionally at a suitable pressure. The dwell time desired for adequate sublimation, transfer, and condensation of the images is generally at least 15 seconds and up to and including 90 seconds, such as at least 30 seconds and up to and including 60 seconds. Temperature and time for this thermal transfer process can be adjusted by a skilled artisan using routine experimentation so that at least 60 weight %, or even at least 80 weight % of the colorant (ink) in the thermal donor element is transferred to the foamed, opacifying element. The amount of such thermal transfer can be evaluated by measuring the weight of thermal donor element before and after thermal image transfer, or by measuring the transmission density of the image or pattern on the thermal donor element before and after thermal image transfer using a commercial densitometer.

In addition to providing a colored image or pattern by thermal transfer, the present invention can also include providing a protective clear film (laminate) to the porous substrate by thermal transfer. Such protective clear film or overcoat can be applied over the thermally transferred colorant image or pattern, or on a surface opposite the thermally transferred colorant image or pattern. This protective clear film can be provided with a separate thermal donor element (or ribbon) for example as described in U.S. Patent Application Publication 2010/0218887 (Vreeland et al.), the disclosure of which is incorporated herein by reference. Other details of such clear laminates are provided in [0118]-[0120] of U.S. '887 (noted above). Alternatively, the protective clear film can be provided as a separate patch in a thermal donor element that has one or more thermally transferable colorant patches as well as a patch to supply the protective clear film.

For example, in some embodiments, a protective clear film can be thermally applied (printed) over a color thermally printed image or pattern on the opposing external side of the porous substrate. In other embodiments, a protective clear film can be thermally applied (printed) over a color thermally printed image or pattern on the dry opacifying layer on the internal side of the porous substrate. In yet other embodiments, a protective clear film can be thermally applied (printed) on the opposing external surface that does not have a color thermally printed image or pattern, but such color thermally printed image or patterns is disposed on the dry opacifying layer on the internal side of the porous substrate.

The present invention can also be used to thermally transfer metal images or patterns for various metallic effects on a thermally transferred color image on either side of the porous substrate using a uniquely designed thermal donor element containing transferable metals instead of dyes or other colorants in a metal donor layer. Details about such materials and uses thereof are described in [0121] of US '218 (noted above) and publications cited therein.

The present invention provides at least the following embodiments and combinations thereof, but other combinations of features are within the present invention as a skilled artisan would appreciate from the teaching of this disclosure:

1. A foamed, opacifying element comprising a thermal colorant image, the foamed, opacifying element further comprising a porous substrate having an opposing external surface and an internal surface, the internal surface having a dry foamed composition disposed thereon as a dry opacifying layer, wherein the dry foamed composition comprises:

(a) at least 0.1 weight % and up to and including 40 weight % of porous particles, each porous particle comprising a continuous polymeric phase and a first set of discrete pores dispersed within the continuous polymeric phase, the porous particles having a mode particle size of at least 2 μm and up to and including 50 μm and a porosity of at least 20 volume % and up to and including 70 volume %, and the continuous polymeric phase having a glass transition temperature greater than 80° C. and comprising a polymer having a viscosity of at least 80 centipoises and up to and including 500 centipoises at a shear rate of 100 sec$^{-1}$ in ethyl acetate at a concentration of 20 weight % at 25° C.;

(b) at least 10 weight % of an at least partially cured binder material;

(c) at least 0.2 weight % of one or more additives comprising a surfactant;

(d) less than 5 weight % of water; and (e) at least 0.002 weight % of an opacifying colorant different from all of the one or more (c) additives, which opacifying colorant absorbs predetermined electromagnetic radiation, all amounts being based on the total weight of the dry foamed composition, wherein the dry opacifying layer has a light blocking value of at least 4 as well as a luminous reflectance that is greater than 40% as measured by the Y tristimulus value, and wherein the thermal colorant image that is derived from thermal colorant transfer is disposed on the opposing external surface, the dry opacifying layer, or both the opposing external surface and the dry opacifying layer.

2. The foamed, opacifying element of embodiment 1, wherein the porous substrate comprises a porous textile web, porous polymer film, porous cellulosic material, porous ceramic material, or porous glass material.

3. The foamed, opacifying element of embodiment 1 or 2, wherein the porous substrate comprises a polyester.

4. The foamed, opacifying element of any of embodiments 1 to 3, wherein the dry opacifying layer is the only layer disposed on the porous substrate.

5. The foamed, opacifying element of any of embodiments 1 to 3, further comprising a dry non-opacifying layer disposed on the dry opacifying layer.

6. The foamed, opacifying element of embodiment 5, wherein the dry non-opacifying layer comprises a tinting colorant, a flame retardant, an antimicrobial agent, an anti-blocking agent, or a flocking agent.

7. The foamed, opacifying element of any of embodiments 1 to 6, wherein the dry opacifying layer exhibits a light blocking value of at least 5.

8. The foamed, opacifying element of any of embodiments 1 to 7, wherein the continuous polymeric phase comprises at least 70 weight %, based on the total polymer weight in the continuous polymeric phase, of one or more polymers derived from one or more of cellulose acetate, cellulose butyrate, cellulose acetate butyrate, and cellulose acetate propionate.

9. The foamed, opacifying element of any of embodiments 1 to 8, wherein the opacifying colorant is a carbon black that is present in an amount of at least 0.002 weight % and up to and including 1 weight %, based on the total weight of the dry foamed composition.

10. The foamed, opacifying element of any of embodiments 1 to 9, wherein the dry foamed composition comprises at least 0.5 weight % and up to and including 10 weight % of the porous particles, based on the total weight of the dry foamed composition, which porous particles have a mode particle size of at least 3 μm and up to and including 30 μm.

11. The foamed, opacifying element of any of embodiments 1 to 10, wherein:

the dry foamed composition has at least 98% solids;

the continuous polymeric phase comprises at least 70 weight % and up to and including 100 weight %, based on the total polymer weight in the continuous polymeric phase, of one or more polymers derived from one or more of cellulose acetate, cellulose butyrate, cellulose acetate butyrate, and cellulose acetate propionate;

the porous particles are present in an amount of at least 0.5 weight % and up to and including 10 weight %;

the at least partially cured binder material is present in an amount of at least 20 weight % and up to and including 60 weight % and has a glass transition temperature of less than 25° C.;

the one or more (c) additives further comprise an optical brightener in an amount of at least 3 weight % and up to and including 45 weight %;

carbon black is present as at least one opacifying colorant in an amount of at least 0.002 weight % and up to and including 1 weight %; and the dry opacifying layer has a light blocking value of at least 5, all amounts based on the total weight of the dry foamed composition.

12. The foamed, opacifying element of any of embodiments 1 to 11, wherein the one or more (c) additives further comprise metal flakes that are present within the porous particles.

13. The foamed, opacifying element of any of embodiments 1 to 12, wherein the surfactant of the one or more (c) additives is a foaming agent and the one or more (c) additives further comprise a foam stabilizing agent.

14. The foamed, opacifying element of any of embodiments 1 to 13, wherein the one or more (c) additives further comprise a tinting colorant in an amount of least 0.0001 weight % and up to and including 3 weight %, based on the total weight of the dry foamed composition.

15. The foamed, opacifying element of any of embodiments 1 to 14, wherein the one or more (c) additives further comprise an optical brightener in an amount of at least 0.001 weight % and up to and including 0.4 weight %, based on the total weight of the dry foamed composition.

16. The foamed, opacifying element of any of embodiments 1 to 15, wherein the one or more (c) additives comprise an antimicrobial agent comprising silver metal, a silver-containing compound, copper metal, a copper-containing compound, or a mixture of any of these.

17. The foamed, opacifying element of any of embodiments 1 to 16, wherein the thermal colorant image comprises a sublimed cyan, yellow, magenta, or black dye, or a combination thereof.

18. The foamed, opacifying element of any of embodiments 1 to 17, wherein the thermal colorant image further comprises metal particles provided by thermal transfer.

19. The foamed, opacifying element of any of embodiments 1 to 18, wherein the thermal colorant image is a multi-color image on the opposing external surface of the porous substrate.

20. The foamed, opacifying element of any of embodiments 1 to 19, further comprising a transparent protective layer over the thermal colorant image.

The following Examples are provided to illustrate the practice of this invention and are not meant to be limiting in any manner. The following materials were used in the Examples.

Materials Used in the Following Examples

The continuous polymeric phase polymers used in the following examples were the Eastman™ Cellulose Acetate Butyrate 381-0.5 (CAB), a cellulose ester, $T_g$ of 130° C. (obtained from Chem Point);

NALCO® 1060 containing colloidal silica was obtained from Nalco Chemical Company as a 50 weight % aqueous dispersion.

The poly(methylamino ethanol adipate) (AMAE) co-stabilizer was prepared using known procedures and starting materials.

Carboxy methylcellulose (CMC, 250,000 kDa) was obtained from Acros Organics or from Ashland Aqualon as Aqualon 9M31F. These products were used interchangeably.

The amphiphilic block copolymer of polyethylene oxide and polycaprolactone (PEO-b-PCL) 5K-20K, was prepared using the procedure described in U.S. Pat. No. 5,429,826 (Nair et al.), the disclosure of which is incorporated herein by reference, wherein the first number is the molecular weight of the hydrophilic block segment, PEO, and the second number is the molecular weight of the oleophilic block segment, PCL.

TERGITOL® 15-S-7, a C12-C14 secondary alcohol surfactant having an HLB value of 12.4, was obtained from the Dow Chemical Corp.

The optical brightener TINOPAL® OB CO was obtained from BASF Corporation.

The porous substrate used in the Examples below was a porous woven 100% polyester fabric Copland Muslin AS931/1 obtained from Copland Industries having a weight of approximately 80-110 g/m$^2$.

The carbon black (K) opacifying colorant used as an aqueous dispersion was Regal 330 (Cabot Corp.) that was hydrophobically surface modified.

SOLSPERSE® 43000, a polyacrylate polymeric dispersant, was obtained from Lubrizol Corp.

The Drapery Compounds were obtained from Eagle Performance Products, where the binder material was a self-crosslinking terpolymer derived from polymerization of acrylonitrile, n-butyl acrylate, and ethyl acrylate, and having a glass transition temperature of −10° C.

Measurements:

The mode particle size of the porous particles used in the Examples was measured using a Sysmex FPIA-3000 automated particle size analyzer from Malvern Instruments. The particle size of the dispersed pigments was determined using light scattering.

The porosity of the porous particles was measured using the mercury intrusion porosimetry method described earlier The light-blocking ability of each foamed, opacifying element in the Examples, in transmitted light, was evaluated by measuring its light-blocking value (LBV) using a custom-built apparatus consisting of a fiber optic Xenon light source, a computer controlled translational stage and an optical photometer. The fiber optic was positioned 10 mm above the surface of the fabric. A photo detector was placed on the other side of the sample element directly under the fiber optic to quantify the amount of light that passed through the sample element. The light-blocking value of each sample was calculated by comparing the light intensity (1) that passed through the sample element to the light intensity ($I_0$) that reached the detector when no sample element was present, and using the equation:

$$-\log_{10}(I/I_0)$$

The luminous reflectance (or brightness) of each sample element was determined by first measuring the spectral reflectance in the 400-700 nm wavelength range using a Hunter Labs UltraS can XE colorimeter equipped with an integrating sphere and a pulsed Xenon light source. A light trap and a standard white tile were used to fix the reflectance range from 0 to 100%. The X, Y, and Z tristimulus values of each dry opacifying layer were also determined and used in conjunction with the CIELab color space (standard D65 illuminant) to calculate specific values for the lightness (L*), red-green character (a*), and yellow-blue character (b*) of each dry opacifying layer. The Y tristimulus value was used as a measure of the luminous reflectance or "brightness" of each sample.

Thermal Colorant Transfer Process:

This process used a thermal donor element comprised of Epson 64" Adhesive Textile Paper onto which desired mirror-image designs or patterns had been inkjet printed using an Epson F9200 inkjet printer. The mirror-image designs or patterns comprised inks containing sublimable dyes and had been manufactured by Kiian Digital.

Thermal colorant transfer was carried out using a roll-to-roll machine having large industrial sublimation calendars. The nip was created by a roll and a belt into which a thermal donor element and superposed opposing external surface of a porous substrate in a foamed, opacifying element (having a dry opacifying layer on the internal surface) were brought into contact. The nip dwell time was 30 seconds at 30 psi (207 kPa), and the nip temperature was 190° C. to 205° C., causing sublimation of the sublimation dyes in the colorant donor layer and their binding to the porous substrate opposing external surface. Transfer quality was evaluated by visible inspection.

Preparation of Opacifying Colorant Dispersions for Porous Particles:

The opacifying colorant (K), carbon black dispersion was prepared by combining 10.42 weight % of the dry pigment, SOLSPERSE® 43000 dispersant (20 weight % of the opacifying colorant), and water in a suitable milling vessel. The particle size of the opacifying colorant pigment was reduced by milling it using ceramic media until all opacifying colorant particles were reduced below a diameter of 1 μm as determined by optical microscopy. The dispersion was further diluted with water for incorporation into porous particles. Dv, the volume weighted mean diameter in nanometers, was 101 nm.

Preparation of Porous Particles:

The porous particles used for preparing a foamed, opacifying element for the Invention Examples is described below.

P1 Porous Particles Containing 0.8 Weight % Opacifying Colorant (K) in the Discrete Pores and 1 Weight % Optical Brightener in Continuous Polymeric Phase CAB An aqueous phase was made up by dissolving 5 grams of CMC in 240.5 grams of distilled water and adding to 4.3 grams of the D-K dispersion containing 18.6 weight % of carbon black. This aqueous phase was dispersed in 831.8 grams of an oil phase containing 97.7 grams of CAB, 2 grams of PEO-b-PCL and 1 gram of the optical brightener, TINOPAL® OB CO in ethyl acetate using a homogenizer. A 975-gram aliquot of the resulting water-in-oil emulsion was dispersed using the Silverson L4R homogenizer for two minutes at 1200 RPM, in 1625 grams of a 200 mmolar pH 4 acetate buffer containing 39 grams of NALCO® 1060 colloidal silica, and 9.75 grams of AMAE co-stabilizer followed by homogenization in an orifice homogenizer at 1000 psi (70.4 kg/cm$^2$) to form a water-in-oil-in-water double emulsion. The ethyl acetate was removed under reduced pressure at 40° C. after dilution of the water-in-oil-in-water emulsion with an equal weight of water. The resulting suspension of solidified porous particles was filtered and the resulting P1 porous particles were washed with water several times, followed by rinsing with a 0.05 weight % solution of TERGITOL® 15-S-7 surfactant. The isolated P1 porous particles were then air dried. The porous particles had a mode particle size of 4.3 μm and a porosity of 40 volume %. Typically, the discrete pores contained within the porous particles prepared according to this procedure had an average diameter of from 150 nm and up to and including 1,500 nm.

Preparation of Foamable Aqueous Composition; Foamed Aqueous Composition; and Foamed, Opacifying Element:

In general, the foamable aqueous composition was made by incorporating the porous particles in 48 weight % solids EAGLETEX® C-3018 Drapery Compound. For each foamed aqueous composition, the Drapery compound was added to an appropriately sized container. Porous particles were dispersed into the mixture by stirring at 1200 rev/minute with a 50 mm diameter Cowles blade at ambient temperature for 30-60 minutes. The resulting dispersion (foamable aqueous composition) was used to prepare a foamed aqueous composition under pressure using an Oakes 2M Laboratory Mixer Model 2MBT1A. The resulting foamed aqueous composition, having a density of from 0.18 g/cm$^3$ to 0.22 g/cm$^3$, was coated onto a surface of the porous substrate described above with a coating knife, dried at a temperature of from 120° C. to 160° C. until the moisture content was less than 2 weight %, and crushed ("densified") on the porous substrate between hard rollers under pressure.

Invention Example 1: Thermal Printing on External Surface

An image was thermally printed on the external surface of a porous substrate in a dry opacifying elements in the following manner.

A foamable aqueous composition was prepared with 1400 g of EAGLETEX® C-3018 Drapery Compound and 100 g of a 49 weight % aqueous dispersion of the P1 porous particles. This foamable aqueous composition was foamed (aerated) and the resulting foamed aqueous composition was coated onto the internal surface of the porous substrate described above using a coating knife with a 2.54 mm (0.100 inch) gap in a coating machine at 1 m/min and dried at 160° C. The resulting dry foamed composition (dry opacifying layer) in the resulting foamed, opacifying element contained 6.71 weight % of the P1 porous particles, 0.0557 weight % of carbon black (0.136 g/m$^2$ of carbon black on a dry weight basis). This foamed, opacifying element exhibited an LBV of 5.8 for the dry opacifying layer weight of 185 g/m$^2$, a luminous reflectance value of 52.

A sample of this foamed, opacifying element was thermally printed in accordance with the procedure for thermal colorant transfer process described above to impart a multi-color floral image to the opposing external side of the porous substrate. Good heat transfer printability was evidenced by the fact that 70-80 weight % of the original colorant(s) was transferred from the thermal donor element without risk of damaging the foamed, opacifying element. The print quality was acceptable in as many colors as were available in the thermal donor element. No delamination of the foamed, opacifying element, and no noticeable off-gassing from the foamed, opacifying element during the thermal colorant transfer process were observed.

Invention Example 2: Thermal Printing on Dry Opacifying Layer

Another foamed, opacifying element was prepared according to the present invention using the foamable aqueous composition and foamed, opacifying element described above for Invention Example 1, except that a multi-color floral image was thermally printed onto the dry opacifying layer of the foamed opacifying element. The quality of the thermal print in many colors was acceptable and no delamination or off-gassing was observed during the thermal colorant transfer process.

Additional Invention Examples

In some other Invention Examples carried out similarly to Invention Example 1, both the opposing external side and the dry opacifying layer on the internal side of the foamed, opacifying element were printed sequentially. In all examples, the quality of the thermally transferred color image was acceptable. No delamination or off-gassing was observed for any of the examples.

In addition, various patterns (images) were similarly thermally transferred (printed) from suitable thermal donor elements to the opposing external surface of the porous substrate of foamed, opacifying elements as described above, to provide floral, paisley, or animal patterns (images), and a red flat patch (image) with excellent results.

The invention has been described in detail with particular reference to certain preferred embodiments thereof, but it will be understood that variations and modifications can be effected within the spirit and scope of the invention.

The invention claimed is:

1. A foamed, opacifying element comprising a thermal colorant image, the foamed, opacifying element further comprising a porous substrate having an opposing external surface and an internal surface, the internal surface having a dry foamed composition disposed thereon as a dry opacifying layer, wherein the dry foamed composition comprises:
(a) at least 0.1 weight % and up to and including 40 weight % of porous particles, each porous particle comprising a continuous polymeric phase and a first set of discrete pores dispersed within the continuous polymeric phase, the porous particles having a mode particle size of at least 2 μm and up to and including 50 μm and a porosity of at least 20 volume % and up to and including 70 volume %, and the continuous polymeric phase having a glass transition temperature greater than 80° C. and comprising a polymer having a viscosity of at least 80 centipoises and up to and including 500 centipoises at a shear rate of 100 sec$^{-1}$ in ethyl acetate at a concentration of 20 weight % at 25° C.;
(b) at least 10 weight % of an at least partially cured binder material;
(c) at least 0.2 weight % of one or more additives comprising a surfactant;
(d) less than 5 weight % of water; and
(e) at least 0.002 weight % of an opacifying colorant different from all of the one or more (c) additives, which opacifying colorant absorbs electromagnetic radiation having a wavelength of from 350 nm to 800 nm, all amounts being based on the total weight of the dry foamed composition, wherein the dry opacifying layer has a light blocking value of at least 4 as well as a luminous reflectance that is greater than 40% as measured by the Y tristimulus value, and wherein the thermal colorant image is disposed on the opposing external surface, the dry opacifying layer, or both the opposing external surface and the dry opacifying layer.

2. The foamed, opacifying element of claim 1, wherein the porous substrate comprises a porous textile web, porous polymer film, porous cellulosic material, porous ceramic material, or porous glass material.

3. The foamed, opacifying element of claim 1, wherein the porous substrate comprises a polyester.

4. The foamed, opacifying element of claim 1, wherein the dry opacifying layer is the only layer disposed on the porous substrate.

5. The foamed, opacifying element of claim 1, further comprising a dry non-opacifying layer disposed on the dry opacifying layer.

6. The foamed, opacifying element of claim 5, wherein the dry non-opacifying layer comprises a tinting colorant, a flame retardant, an antimicrobial agent, an anti-blocking agent, or a flocking agent.

7. The foamed, opacifying element of claim 1, wherein the dry opacifying layer exhibits a light blocking value of at least 5.

8. The foamed, opacifying element of claim 1, wherein the continuous polymeric phase comprises at least 70 weight %, based on the total polymer weight in the continuous polymeric phase, of one or more polymers derived from one or more of cellulose acetate, cellulose butyrate, cellulose acetate butyrate, and cellulose acetate propionate.

9. The foamed, opacifying element of claim 1, wherein the opacifying colorant is a carbon black that is present in an amount of at least 0.002 weight % and up to and including 1 weight %, based on the total weight of the dry foamed composition.

10. The foamed, opacifying element of claim 1, wherein the dry foamed composition comprises at least 0.5 weight % and up to and including 10 weight % of the porous particles, based on the total weight of the dry foamed composition, which porous particles have a mode particle size of at least 3 μm and up to and including 30 μm.

11. The foamed, opacifying element of claim 1, wherein:
the dry foamed composition has at least 98% solids;
the continuous polymeric phase comprises at least 70 weight % and up to and including 100 weight %, based on the total polymer weight in the continuous polymeric phase, of one or more polymers derived from one or more of cellulose acetate, cellulose butyrate, cellulose acetate butyrate, and cellulose acetate propionate;
the porous particles are present in an amount of at least 0.5 weight % and up to and including 10 weight %;
the at least partially cured binder material is present in an amount of at least 20 weight % and up to and including 60 weight % and has a glass transition temperature of less than 25° C.;
the one or more (c) additives further comprise an optical brightener in an amount of at least 3 weight % and up to and including 45 weight %;
carbon black is present as at least one opacifying colorant in an amount of at least 0.002 weight % and up to and including 1 weight %; and
the dry opacifying layer has a light blocking value of at least 5,
all amounts based on the total weight of the dry foamed composition.

12. The foamed, opacifying element of claim 1, wherein the one or more (c) additives further comprise metal flakes that are present within the porous particles.

13. The foamed, opacifying element of claim 1, wherein the surfactant of the one or more (c) additives is a foaming agent and the one or more (c) additives further comprise a foam stabilizing agent.

14. The foamed, opacifying element of claim 1, wherein the one or more (c) additives further comprise a tinting colorant in an amount of least 0.0001 weight % and up to and including 3 weight %, based on the total weight of the dry foamed composition.

15. The foamed, opacifying element of claim 1, wherein the one or more (c) additives further comprise an optical brightener in an amount of at least 0.001 weight % and up to and including 0.4 weight %, based on the total weight of the dry foamed composition.

16. The foamed, opacifying element of claim 1, wherein the one or more (c) additives comprise an antimicrobial agent comprising silver metal, a silver-containing compound, copper metal, a copper-containing compound, or a mixture of any of these.

17. The foamed, opacifying element of claim 1, wherein the thermal colorant image comprises a sublimed cyan, yellow, magenta, or black dye, or a combination thereof.

18. The foamed, opacifying element of claim 1, wherein the thermal colorant image further comprises metal particles provided by thermal transfer.

19. The foamed, opacifying element of claim 1, wherein the thermal colorant image is a multi-color image on the opposing external surface of the porous substrate.

20. The foamed, opacifying element of claim 1, further comprising a transparent protective layer over the thermal colorant image.

* * * * *